(12) United States Patent
McAlexander

(10) Patent No.: US 7,054,012 B2
(45) Date of Patent: May 30, 2006

(54) SPECTRAL PHASE MEASUREMENT USING PHASE-DIVERSE COHERENT OPTICAL SPECTRUM ANALYZER

(75) Inventor: William I. McAlexander, Redwood City, CA (US)

(73) Assignee: Agilent Technologies, INC, Palo Alto, CA (US)

( * ) Notice: Subject to any disclaimer, the term of this patent is extended or adjusted under 35 U.S.C. 154(b) by 354 days.

(21) Appl. No.: 10/735,142

(22) Filed: Dec. 11, 2003

(65) Prior Publication Data

US 2004/0246492 A1 Dec. 9, 2004

Related U.S. Application Data

(63) Continuation-in-part of application No. 10/458,336, filed on Jun. 9, 2003.

(51) Int. Cl.
*G01B 9/02* (2006.01)

(52) U.S. Cl. ...................................................... 356/484
(58) Field of Classification Search ................ 356/450, 356/477, 484; 324/76.19, 76.21, 76.22, 76.23, 324/76.36; 398/204
See application file for complete search history.

(56) References Cited

U.S. PATENT DOCUMENTS 5,115,332 A * 5/1992 Naito et al. ................. 398/202
5,365,185 A * 11/1994 Bar-David ................. 329/308
2005/0068533 A1 * 3/2005 Gurunathan et al. ........ 356/402

FOREIGN PATENT DOCUMENTS

GB 2197461 A 5/1988

OTHER PUBLICATIONS

Kazovsky, Leonid G., "Phase- and Polarization-Diversity Coherent Optical Techniques." Feb., 1989, Journal of Lightwave Technology, vol. 7, No. 2. pp. 279-292.*
Van Deventer M O et al., Title: "High-Dynamic-Range Heterodyne Measurement Of Optical Spectra", Optical Letters, Optical Society Of America, Washington, US, vol. 16, No. 9, May 1, 1991, pp. 678-680.
European Search Report Dated: Apr. 5, 2005.

* cited by examiner

*Primary Examiner*—Gregory J. Toatley, Jr.
*Assistant Examiner*—Michael A. Lyons

(57) ABSTRACT

Embodiments in accordance with the invention provide an optical spectrum analyzer. The optical spectrum analyzer includes a receiver for receiving an optical local oscillator signal and an unknown optical signal. The receiver outputs three or more phase-diverse heterodyne signals. The phase-diverse heterodyne signals are coupled to a phase quadrature generator. The phase quadrature generator produces a first and second phase quadrature signals that are ninety degrees out of phase with respect to each other. The first and second phase quadrature signals are coupled to a complex signal generator. The complex signal generator produces a complex signal having a positive and negative image. A measurement processing unit determines the phase of the unknown optical signal from the relative difference of the phase of the positive and negative image of the complex signal.

27 Claims, 12 Drawing Sheets

SPECTRAL PHASE MEASUREMENT USING PHASE-DIVERSE COHERENT OPTICAL SPECTRUM ANALYZER

RELATED APPLICATION

This application is a continuation-in-part of U.S. application Ser. No. 10/458,336, filed Jun. 9, 2003.

FIELD OF THE INVENTION

Embodiments in accordance with the invention relate to optical spectral analysis, and more particularly to optical spectral phase measurement.

BACKGROUND OF THE INVENTION

High-resolution optical spectrometers are used to observe spectral features of an unknown signal. Some high-resolution optical spectrometers implement a heterodyne architecture based upon principles of coherent optical spectral analysis to achieve very fine measurement resolution (also known as coherent optical spectral analyzers). In accordance with this heterodyne architecture, current coherent optical spectral analyzers utilize a 2×2 optical coupler to combine the unknown signal with a local oscillator signal. The local oscillator signal is set to oscillate at a known frequency or is swept across a range of frequencies. The two outputs of the coupler are detected through a nonlinear detector, such as a photodiode, and the resulting electrical signals are subtracted from one another to isolate the desired heterodyne signal. From this, the spectral features of the unknown signal can be obtained.

To perform a measurement utilizing a coherent optical spectral analyzer, the local oscillator signal is swept across different wavelengths, while the heterodyne signal due to mixing with the unknown signal is acquired. Unfortunately, the current receiver architecture, which is based on a 2×2 optical coupler, is unable to measure the precise phase of the heterodyne signal.

The problem with measuring the phase of the heterodyne signal stems from the basic phase ambiguity of a sinusoidal function. Typically, the heterodyne signal as described above will have the general form:

$$H(t)=V(t)\cos(\Delta\omega t+\Delta\phi(t)) \quad (1)$$

as shown in Equation 1, where $\Delta\omega$ represents a frequency difference between the local oscillator and unknown signal, and $\Delta\phi(t)$ represents the relative phase of the heterodyne beat signal. A single measurement of H(t) is unable to resolve $\Delta\phi(t)$, the desired heterodyne phase, because there are two unknowns (V(t) and $\Delta\phi(t)$).

Accordingly, optical spectrum analyzers, according to the conventional art, try to measure V(t) while ignoring $\Delta\phi(t)$. However, amplitude uncertainty is introduced into the spectral measurement of V(t), because the phase of the heterodyne signal varies throughout the scan, as well as from scan to scan. Furthermore, the inability to observe the phase of the heterodyne signal also results in the receiver being equally sensitive to both positive and negative heterodyne beat frequencies. Therefore, attempts to reduce phase uncertainty by using a bandpass receiver will result in the formation of spectral images that limit the ultimate resolution of the device.

SUMMARY OF THE INVENTION

Embodiments in accordance with the invention provide a system and method of complex optical spectrum analysis. The system comprises an optical receiver, a phase quadrature generator, a complex signal generator, a measurement processing unit and a display unit. A first optical local oscillator signal and an unknown optical signal are received by the optical receiver. The phase quadrature generator is coupled between the optical receiver and the complex signal generator. The measurement processing unit is coupled between the complex signal generator and the display unit. The display unit outputs the measured phase and amplitude characteristics of the unknown optical signal.

The method of optical spectrum analysis comprises receiving an optical local oscillator signal and an unknown optical signal. Three or more phase-diverse heterodyne optical signals are generated as a function of the optical local oscillator signal and the unknown optical signal. A first and second phase quadrature signals are generated as a function of the three or more phase-diverse heterodyne signals. A complex signal is generated as a function of the first and second phase quadrature signals. The phase and amplitude of the unknown optical signal is determined from the complex signal.

BRIEF DESCRIPTION OF THE DRAWINGS

Embodiments in accordance with the invention are illustrated by way of example and not by way of limitation, in the figures of the accompanying drawings and in which like reference numerals refer to similar elements and in which.

DETAILED DESCRIPTION OF THE INVENTION

Reference will now be made in detail to embodiments in accordance with the invention, examples of which are illustrated in the accompanying drawings. While various embodiments in accordance with the invention will be described, it will be understood that they are not intended to limit the invention to these embodiments in accordance with the invention. On the contrary, the invention is intended to cover alternatives, modifications and equivalents, which may be included within the spirit and scope of the invention as defined by the appended claims. Furthermore, in the following detailed description of the embodiments in accordance with the invention, numerous specific details are set forth in order to provide a thorough understanding of various embodiments in accordance with the invention. However, it is understood that embodiments in accordance with the invention may be practiced without these specific details. In other instances, well-known methods, procedures, components, and circuits have not been described in detail as not to unnecessarily obscure aspects of embodiments in accordance with the invention.

Embodiments in accordance with the invention provide a system and method of spectral analysis. The system and method generate phase-diverse coherent optical signals from which a complex signal is determined. The positive and negative image of the complex signal is utilized to achieve improved accuracy and certainty of phase and amplitude measurements. Furthermore, a complete description of the spectral properties of an unknown optical signal can be determined as a function of the measured spectral amplitude and phase.

Figure 1:
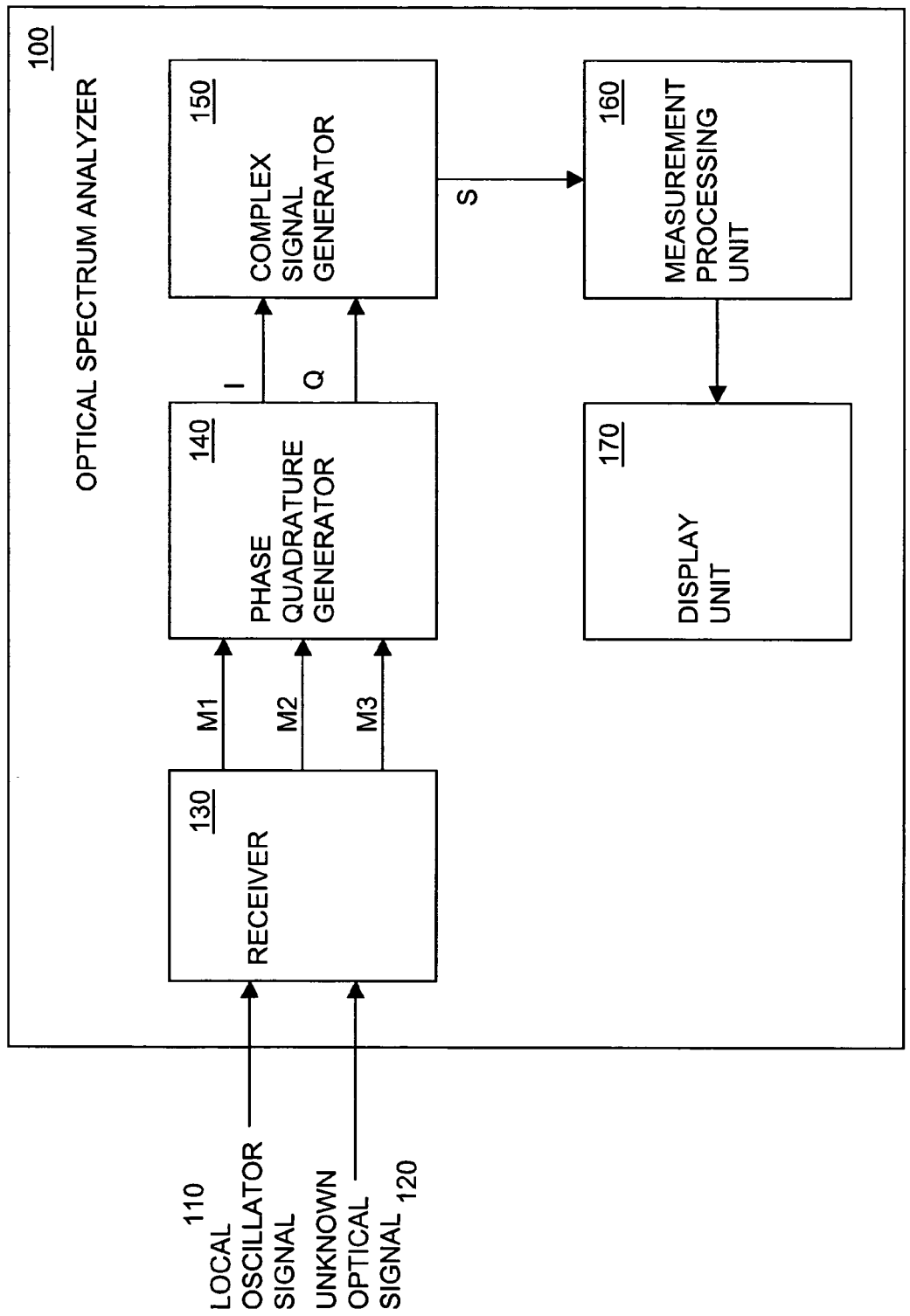
FIG. 1 shows a block diagram of an optical spectrum analyzer, in one embodiment in accordance with the invention.

Referring to FIG. 1, a block diagram of an optical spectrum analyzer 100, in one embodiment in accordance with the invention, is shown. As depicted in FIG. 1, the optical spectrum analyzer 100 comprises a receiver 130, a phase quadrature generator 140, a complex signal generator 150, a measurement processing unit 160 and a display unit 170. The receiver 130 is coupled to the phase quadrature generator 140. The phase quadrature generator 140 is coupled to the complex signal generator 150. The complex signal generator 150 is coupled to the measurement processing unit 160. The measurement processing unit 160 is coupled to the display unit 170.

The receiver 130 receives an optical local oscillator signal 110 at a first input, and an unknown optical signal 120 at a second input. In one embodiment in accordance with the invention, the optical local oscillator signal 110 is provided by a frequency-tunable light source. In one embodiment in accordance with the invention, the local oscillator signal 110 is continuously swept. In one embodiment in accordance with the invention, the unknown optical signal 120 is received from a device under test, an optical network, or the like.

The receiver 130 generates three or more phase-diverse heterodyne signals (e.g., H1, H2 and H3) as a function of the received optical local oscillator signal 110 and unknown optical signal 120. It is understood that signals M1, M2, and M3 contain H1, H2, and H3 respectively in addition to other possible terms. In one embodiment in accordance with the invention, the receiver 130 generates three 120° phase-diverse heterodyne signals H1, H2 and H3. More specifically, heterodyne signals H1 and H2, H2 and H3, H3 and H1 differ in phase from each other by 120 degrees. In another embodiment in accordance with the invention, the receiver 130 generates four 90° phase-diverse heterodyne signals (e.g., H1, H2, H3 and H4). More specifically, each heterodyne signal differs in phase from the phase-adjacent heterodyne signal by 90 degrees.

In one embodiment in accordance with the invention, the phase-diverse heterodyne optical signals H1, H2 and H3, which are contained within M1, M2, and M3 respectively, are received by the phase quadrature generator 140. A pair of phase quadrature signals I and Q are generated by the phase quadrature signal generator 140 as a function of the mixed signals M1, M2, and M3 which contain phase-diverse heterodyne signals H1, H2 and H3. In one embodiment, the phase quadrature signals I and Q are given by Equations 4 and 5, respectively:

$$I = M1 - 2 \cdot M2 + M3 \quad (4)$$

$$Q = \sqrt{3}(M1 - M3) \quad (5)$$

The phase quadrature signals I and Q are received by the complex signal generator 150. A complex signal S is generated by the complex signal generator 150 as a function of the phase quadrature signals I and Q. The complex signal S is given by Equation 6:

$$S = I + iQ = S_O e^{i\phi_O} \quad (6)$$

wherein $S_O$ is the amplitude and $\phi_O$ is the phase.

The complex signal S is received by the measurement processing unit 160. The measurement processing unit 160 determines a positive and negative image of the complex signal S. The measurement processing unit 160 also measures one or more spectral properties of the unknown optical signal 120 as a function of the positive and negative images of the complex signal S. The measurement of spectral properties of the unknown optical signal 120 can comprise amplitude, phase, chirp, chromatic dispersion, polarization mode dispersion and the like. Furthermore, the amplitude and phase measurement information can be used to ascertain the time-domain description of the unknown optical signal 120, allowing the optical spectrum analyzer 100 to make measurements that can be directly compared with a time-domain scope. The display unit 170 generates a display signal representative of the phase and/or amplitude of the unknown optical signal 120 for graphical presentation to a user.

Figure 2:
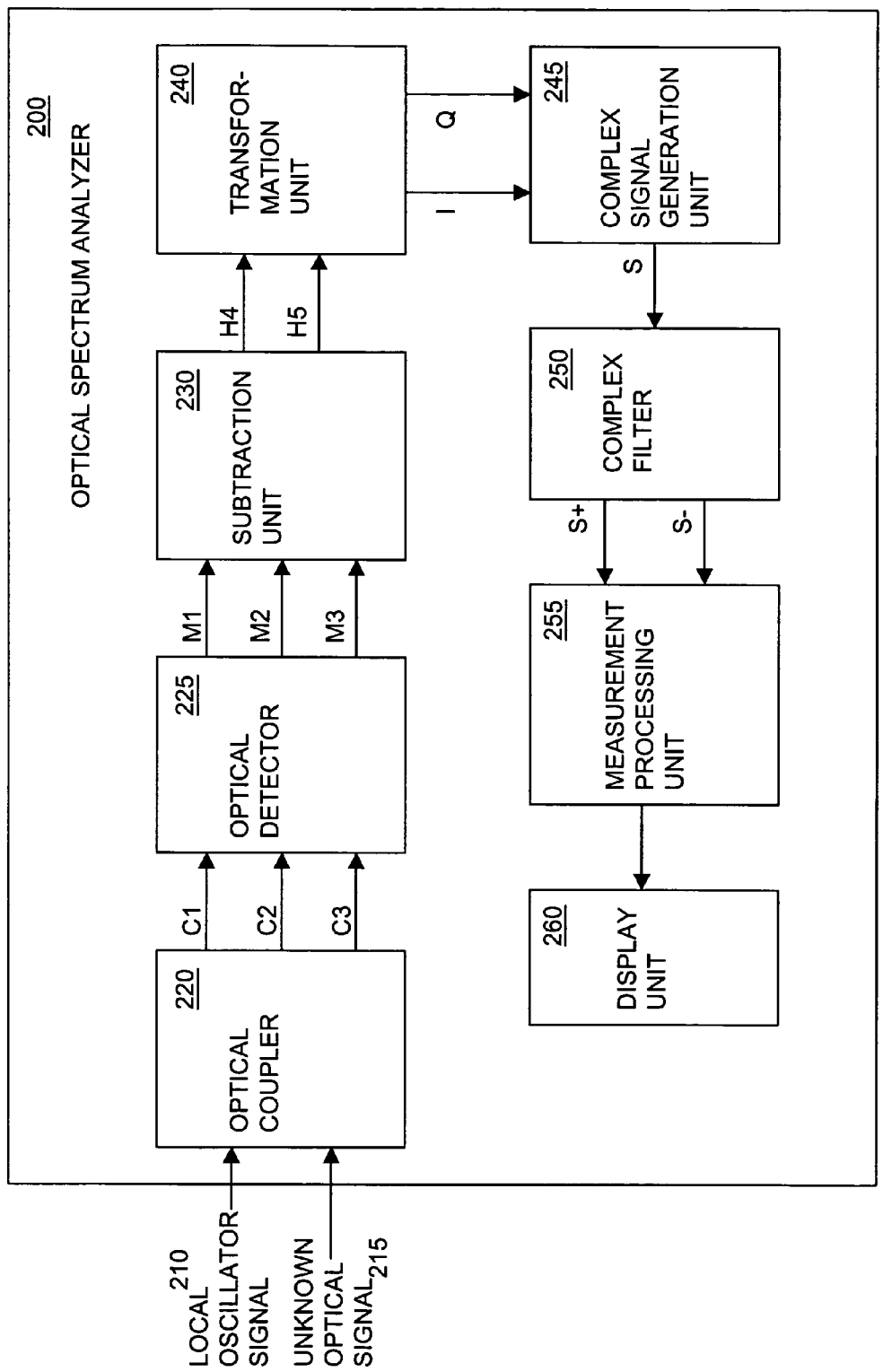
FIG. 2 shows a block diagram of an optical spectrum analyzer, in one embodiment in accordance with the invention.

Referring to FIG. 2, a block diagram of an optical spectrum analyzer 200, in one embodiment in accordance with the invention, is shown. As depicted in FIG. 2, the optical spectrum analyzer 200 comprises an optical coupler 220, an optical detector 225, a subtraction unit 230, a transformation unit 240, a complex signal generation unit 245, a complex filter 250, a measurement processing unit 255 and a display unit 260.

The optical coupler 220 receives an optical local oscillator signal 210 at a first input and an unknown optical signal 215 at a second input. In one embodiment in accordance with the invention, the optical local oscillator signal 210 is provided by a laser source, such as a tunable external cavity laser diode or the like. In one embodiment in accordance with the invention, the unknown optical signal 215 is received from a device under test, an optical network, or the like.

The optical coupler 220 combines the optical local oscillator signal 210 and the unknown optical signal 215 and generates three or more phase-diverse combined optical signals C1, C2 and C3. The combined optical signals C1, C2 and C3 are received by the optical detector 225. The optical detector 225 converts the combined optical signals C1, C2 and C3 into phase-diverse mixed signals M1, M2 and M3, utilizing a nonlinear detector (e.g., photodiode). The nonlinear detector allows the unknown optical signal 215 and the optical local oscillator signal 210 to mix. The phase-diverse mixed signals M1, M2 and M3 are comprised of a phase-diverse heterodyne optical signal and a noise component (e.g., M1=H1+N, M2=H2+N, M3=H3+N). The noise component represents noise generated by the laser source, device under test, optical network, optical coupler, optical detector, photo detector, amplifier and/or the like.

Figure 3:
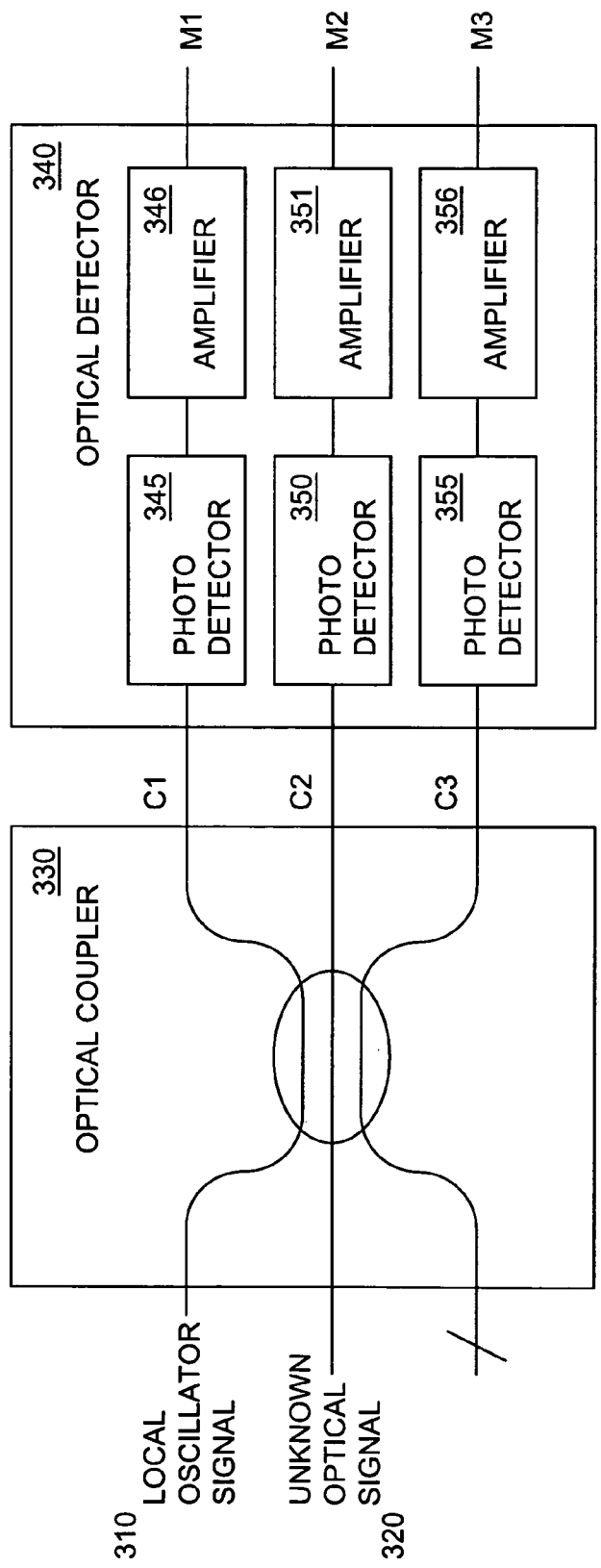
FIG. 3 shows a block diagram of an optical coupler and an optical detector, in one embodiment in accordance with the invention.

Referring now to FIG. 3, a block diagram of an optical coupler 330 and an optical detector 340, in one embodiment in accordance with the invention, is shown. As depicted in FIG. 3, the optical coupler 330 receives an optical local oscillator signal 310 and an unknown optical signal 320 and generates three or more phase-diverse combined optical signals C1, C2 and C3.

In one embodiment in accordance with the invention, optical coupler 330 comprises a 3×3 optical coupler having three optical inputs and three optical outputs. A first input of the 3×3 coupler is coupled to the optical local oscillator signal 310. A second input of the 3×3 coupler is coupled to the unknown optical signal 320. A third input is unconnected and does not receive any signal. It should be appreciated that only two optical inputs are utilized, and thus the third input is not necessary. In one embodiment in accordance with the invention optical coupler 330 is a fiber-optic coupler.

The optical coupler 330 distributes a portion of each of optical local oscillator signal 310 and the unknown optical signal 320 to each of the optical outputs. Accordingly, the three outputs of the 3×3 coupler provide three phase-diverse combined optical signals C1, C2 and C3, respectively. The portion of the signal distributed will be dependent upon the splitting ratio of the optical coupler 330. In one embodiment in accordance with the invention, the 3×3 optical coupler 330 is a balanced optical coupler that has a splitting ratio of one-third to each optical output. However, it should be appreciated that the optical coupler 330 may have a different split ratio such as, for example, but not limited to, a 25/25/50 split ratio. In this situation, the relative response of amplifiers 346, 351, and 356 could be adjusted to compensate for imbalances between the various receiver channels.

For purposes of the present application, embodiments in accordance with the invention are described comprising a 3×3 optical coupler. However, it should be appreciated that those skilled in the art would understand how to implement various embodiments in accordance with the invention using different optical couplers. In one embodiment in accordance with the invention, a 4×4 optical coupler is utilized. In another embodiment in accordance with the invention, a series of 2×2 optical couplers are utilized.

The optical detector 340 comprises a plurality of detectors 345, 350 and 355 and associated amplifiers 346, 351 and 356. Each photo detector 345, 350 and 355 and amplifiers 346, 351, 356 generates a mixed signal (e.g., M1, M2 and M3) as a function of a respective detected combined signal (e.g., C1, C2 and C3, respectively). It is appreciated that phase-diverse mixed signals M1, M2 and M3 includes phase-diverse heterodyne signals H1, H2 and H3, respectively, and a noise component. The phase-diverse heterodyne signals H1, H2 and H3 span the complex space (real and imaginary) of the signal description.

In one embodiment in accordance with the invention, the photo detectors 345, 350 and 355 are photodiodes. However, it should be appreciated that any square-law detection device may be utilized for the photo detectors 345, 350 and 355. Each photodiode 345, 350 and 355 generates a photocurrent proportional to the intensity of the combined optical signals.

Accordingly, phase-diverse mixed signal M1, M2 and M3 are given by Equations 7, 8 and 9, respectively:

$$M1 \propto \tfrac{1}{3}(P_{unknown}+P_{LO}+2\sqrt{P_{LO}P_{unknown}}\cos(\Delta\omega+\Delta\phi)) \quad (7)$$

$$M2 \propto \tfrac{1}{3}(P_{unknown}+P_{LO}+2\sqrt{P_{LO}P_{unknown}}\cos(\Delta\omega+\Delta\phi+2\pi/3)) \quad (8)$$

$$M3 \propto \tfrac{1}{3}(P_{unknown}+P_{LO}+2\sqrt{P_{LO}P_{unknown}}\cos(\Delta\omega+\Delta\phi-2\pi/3)) \quad (9)$$

wherein $P_{LO}$ represents the power (e.g., intensity) of the optical local oscillator signal 310, $P_{unknown}$ represents the power (e.g., intensity) in the unknown optical signal 320, $\Delta\omega$ represents the difference in frequencies between the optical local oscillator signal 310 and unknown optical signal 320, and $\Delta\phi$ represents the difference in phase between the optical local oscillator signal 310 and unknown optical signal 320. It is understood that the heterodyne components of M1, M2, and M3 are identified with H1, H2, and H3 as follows:

$$H1 \propto \tfrac{2}{3}\sqrt{P_{LO}P_{unknown}}\cos(\Delta\omega+\Delta\phi) \quad (10)$$

$$H2 \propto \tfrac{2}{3}\sqrt{P_{LO}P_{unknown}}\cos(\Delta\omega+\Delta\phi+2\pi/3) \quad (11)$$

$$H3 \propto \tfrac{2}{3}\sqrt{P_{LO}P_{unknown}}\cos(\Delta\omega+\Delta\phi-2\pi/3) \quad (12)$$

Figure 4:
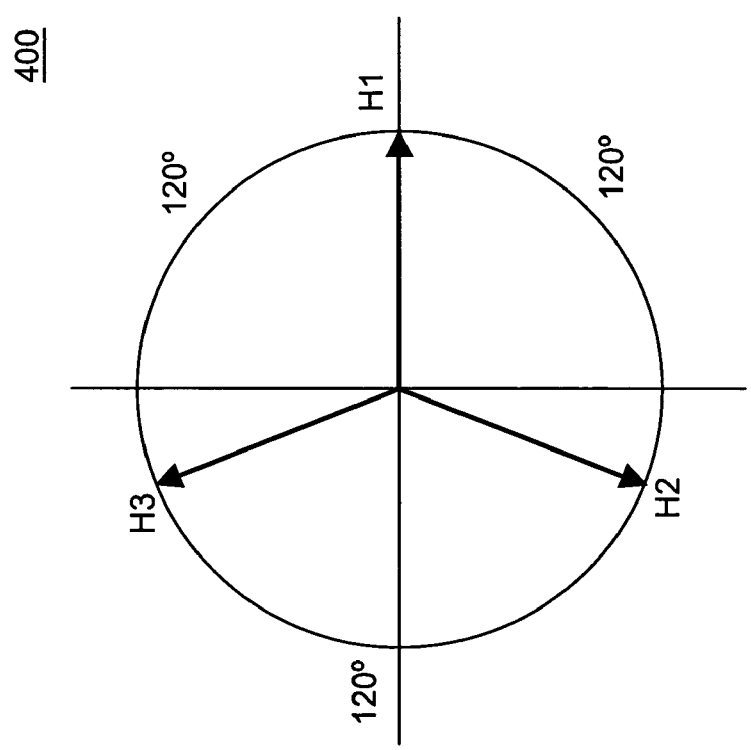
FIG. 4 shows an exemplary graph of the relative phases of the phase-diverse heterodyne signals H1, H2 and H3, in one embodiment in accordance with the invention.

Referring now to FIG. 4, an exemplary graph 400 of the relative phases of the phase-diverse heterodyne signals H1, H2 and H3, in one embodiment in accordance with the invention, is shown. As depicted in FIG. 4, the heterodyne signals H1 and H2, H2 and H3, H3 and H1 differ in phase from each other by 120 degrees.

Referring again to FIG. 2, the phase-diverse mixed signals M1, M2 and M3 are received by the subtraction unit 230. The subtraction unit 230 generates two difference signals, H4 and H5, as a function of the mixed electrical signals M1, M2 and M3. The subtraction process removes the unwanted non-heterodyne portion (e.g., noise component) of the mixed signals M1, M2 and M3, thereby effectively isolating the phase-diverse heterodyne signals H1, H2 and H3. The difference signals H4 and H5 are received by the transformation unit 240. The transformation unit 240 generates phase quadrature signals I and Q as a function of difference signals H4 and H5.

Figure 5:
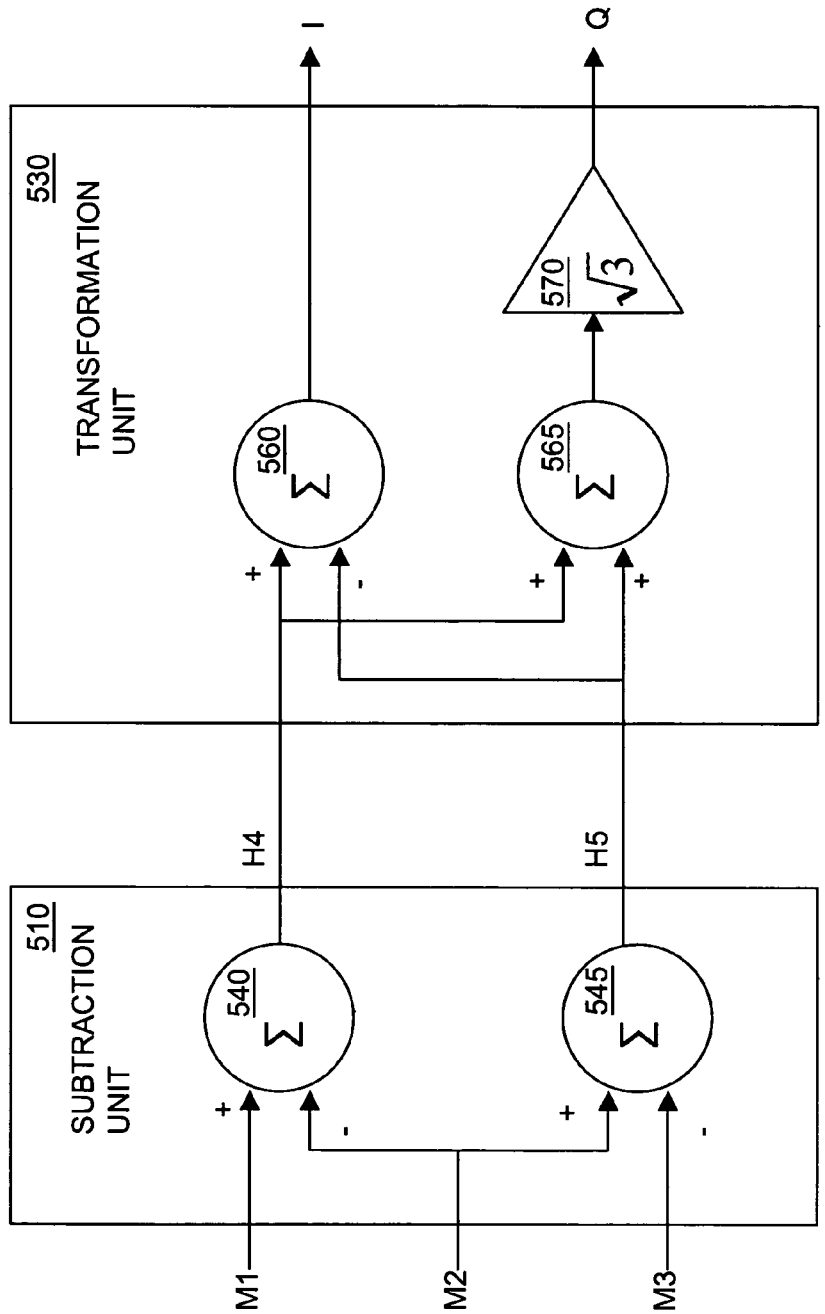
FIG. 5 shows a block diagram of a subtraction unit and a transformation unit, in one embodiment in accordance with the invention.

Referring now to FIG. 5, a block diagram of a subtraction unit 510 and a transformation unit 530, in one embodiment in accordance with the invention, is shown. As depicted in FIG. 5, the subtraction unit 510 comprises differential summing circuits 540 and 545. In one embodiment according to the invention, the difference between phase-diverse mixed signals M1 and M2 and the difference between mixed signals M3 and M2 are determined. It should be appreciated that any of the mixed signals M1, M2 and M3 can be used as the subtrahend (e.g., "common-mode" channel).

At differential summing circuit 540, a first difference signal H4 is obtained by subtracting M2 from M1, according to Equation 13:

$$H4=M1-M2=H1-H2 \propto \sqrt{P_{LO}P_{unknown}}\cos(\Delta\omega+\Delta\phi) \quad (13)$$

Similarly, at differential summing circuit 545, a second difference signal H5 is obtained by subtracting M3 from M2, according to Equation 14:

$$H5=M2-M3=H2-H3 \propto \sqrt{P_{LO}P_{unknown}}\cos(\Delta\omega+\Delta\phi+2\pi/3) \quad (14)$$

wherein $P_{LO}$ represents the power of the optical local oscillator signal, $P_{unknown}$ represents the power in the unknown optical signal, $\Delta\omega$ represents the difference in frequencies between the optical local oscillator signal and unknown optical signal, and Δϕ represents the difference in phase between the optical local oscillator signal and unknown optical signal.

In one embodiment in accordance with the invention, subtraction unit 510 is implemented as an analog circuitry. In another embodiment in accordance with the invention, the phase-diverse mixed signals (e.g., M1, M2 and M3) are digitized. The subtraction unit 510 is implemented as software code resident within a computer-readable medium. The software code is executed by a processor, whereby digitized phase-diverse mixed signals M1, M2 and M3 are received and difference signals H4 and H5 are generated therefrom.

The transformation unit 530 receives difference signals H4 and H5. The transformation unit 530 operates to transform the difference signals H4 and H5, which differ by 120 degrees, into two phase quadrature signals I and Q, which differ by 90 degrees. Quadrature signal I is determined by subtracting H5 from H4 at differential summing circuit 560, as shown in Equation 15:

$$I = H4 - H5 \quad (15)$$

Substituting the terms for H4 and H5 from Equations 13 and 14, respectively, quadrature signal I is given in accordance with Equation 16:

$$I = H1 - 2 \cdot H2 + H3 \quad (16)$$

Quadrature signal Q is determined by adding H4 and H5 at summing circuit 565, and multiplying this sum by $\sqrt{3}$ at factor circuit 570, according to Equation 17:

$$Q = \sqrt{3}(H4 + H5) \quad (17)$$

Substituting the terms for H4 and H5 from Equations 13 and 14, respectively, quadrature signal Q is given in accordance with Equation 18:

$$Q = \sqrt{3}(H1 - H3) \quad (18)$$

In one embodiment in accordance with the invention, transformation unit 530 is implemented as an analog circuitry. In another embodiment in accordance with the invention, the difference signals H4 and H5 are digital signals. The transformation unit 530 is implemented as software code resident within a computer-readable medium. The software code is executed by a processor, whereby difference signals H4 and H5 are received and signals I and Q are generated therefrom.

It should be appreciated that transformation unit 530 may not be required in particular embodiments in accordance with the invention. For example, where a 4×4 optical coupler is utilized the phase-diverse heterodyne signals vary from each other by multiples of 90 degrees.

Figure 6:
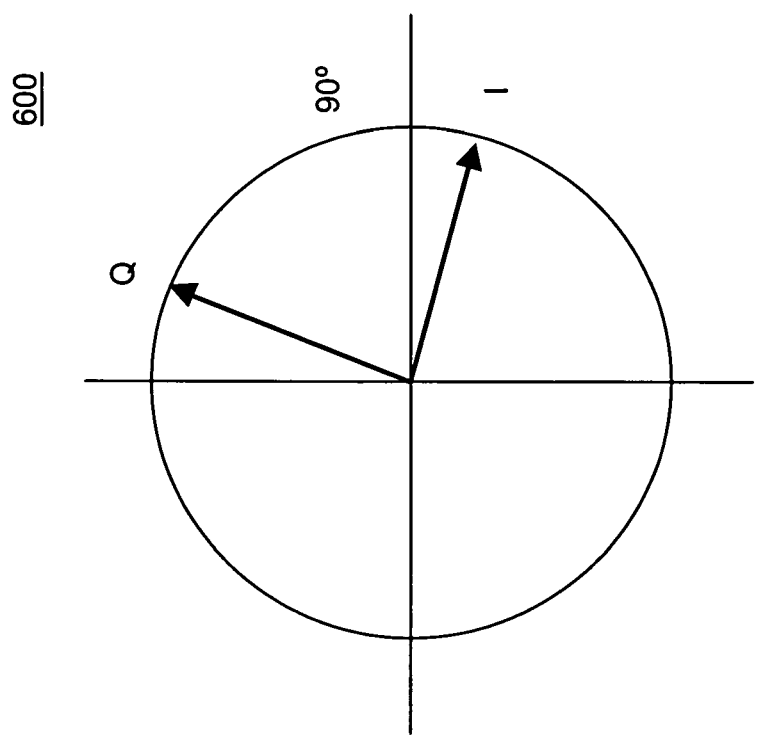
FIG. 6 shows an exemplary graph of the relative phase of the quadrature signals I and Q, in one embodiment in accordance with the invention.

Referring now to FIG. 6, an exemplary graph of the relative phase of the quadrature signals I and Q, in one embodiment in accordance with the invention, is shown. As depicted in FIG. 6, the phase quadrature signals I and Q, generated by the subtraction unit and the transformation unit, differ in phase by 90 degrees and are equal magnitude.

Referring again to FIG. 2, the complex signal generator 245 receives the phase quadrature signals I (e.g., real term) and Q (e.g., imaginary term) from the transformation unit 240. The complex signal generator 245 generates complex signal S as a function of the phase quadrature signals I and Q. The complex signal is given by Equation 19:

$$S = I + i \cdot Q = S_+ + S_- \quad (19)$$

wherein $S_+$ and $S_-$ represent positive and negative frequencies or images, respectively, of the complex signal S. The positive and negative images $S_+$ and $S_-$ are given by Equations 17 and 18, respectively:

$$S_+ = 2\sqrt{P_+ P_{LO}}\, e^{i(+\Delta\omega \cdot t + \Delta\phi_+)} \quad (17)$$

$$S_- = 2\sqrt{P_- P_{LO}}\, e^{i(-\Delta\omega \cdot t + \Delta\phi_-)} \quad (18)$$

The complex signal S is received by the complex filter 250. The complex filter 250 individually filters out the positive and negative image components $S_+$ and $S_-$ of the complex signal S. The positive and negative image components $S_+$ and $S-$ each specify the amplitude and phase of the positive and negative images respectively. Furthermore, the phase difference of the $S_+$ and $S_-$ components is insensitive to the phase noise of the local oscillator optical signal and the unknown optical signal.

The measurement processing unit 255 receives the positive and negative image components $S_+$ and $S_-$ of the complex signal S. The positive and negative image components $S_+$ and $S_-$ can be phase compared by the measurement processing unit 255 to determine the relative phase difference thereof. The relative phase difference can be utilized to determine the spectral phase characteristic of the unknown optical signal 215 as the local oscillator signal 210 is swept across the frequency spectrum of the unknown optical signal 215. The measurement processing unit 255 can also measure one or more additional spectral properties of the unknown optical signal 215, such as amplitude, chirp, chromatic dispersion and polarization mode dispersion. For example, the spectral amplitude characteristic can be determined as a function of the amplitude of the positive image $S_+$ of the complex signal, the negative image $S_-$ of the complex signal or the average of the positive $S_+$ and negative $S_-$ images of the complex signal.

In addition, the spectral amplitude and phase characteristics can be utilized to ascertain the time-domain description of the unknown optical signal 215. Accordingly, the optical spectrum analyzer 200 can make measurements that can be compared with measurements made by a time-domain scope.

The display unit 260 generates one or more display signals representative of the one or more measured spectral characteristics. The display unit provides for graphical presentation of the measurements to a user.

Figure 7:
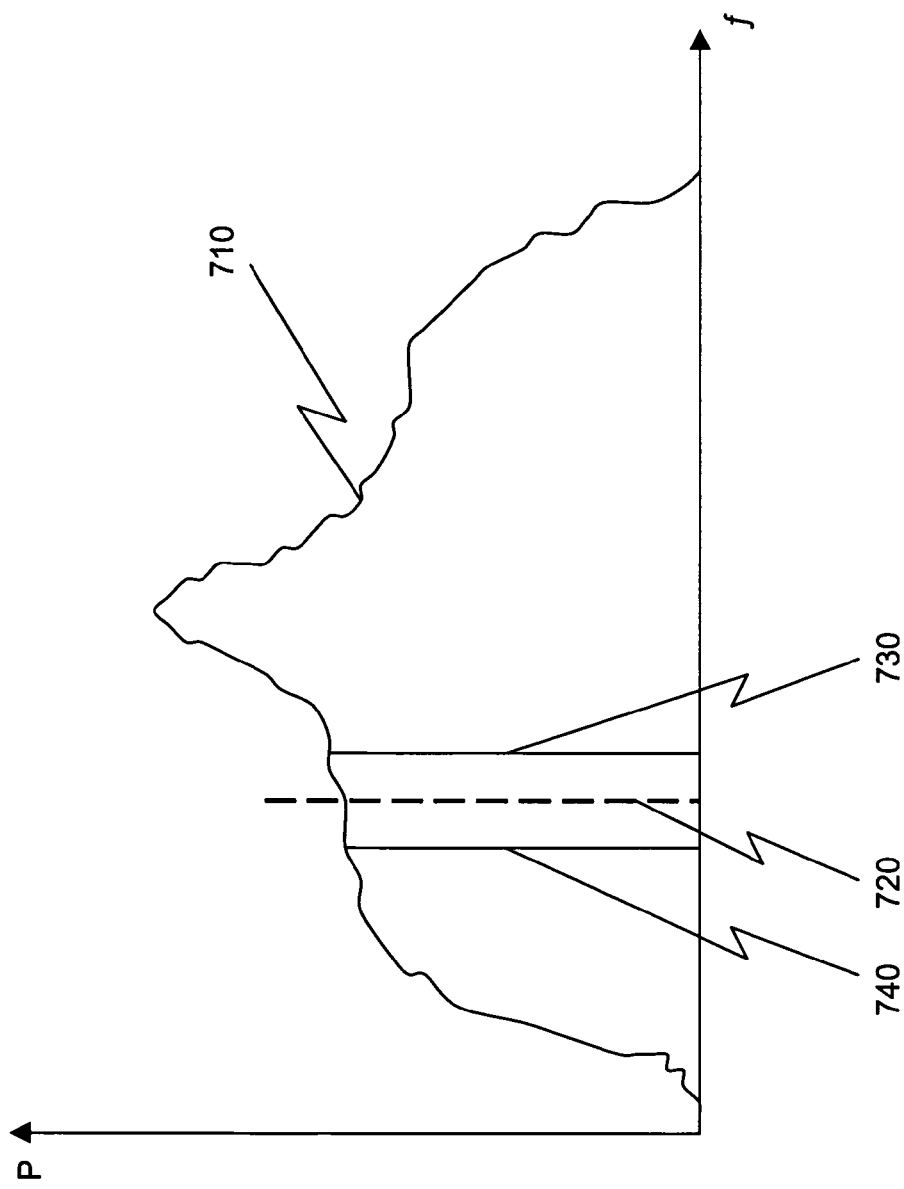
FIG. 7 shows a graph of an exemplary unknown optical signal, in one embodiment in accordance with the invention.

Referring now to FIG. 7, a graph of an exemplary unknown optical signal 710, in one embodiment in accordance with the invention, is shown. As depicted in FIG. 7, a local oscillator signal 720 is swept through the bandwidth of the unknown optical signal 710. At each wavelength (e.g., frequency) of the local oscillator signal 720, a positive and negative image, 730 and 740 respectively, of a complex signal S (e.g., beat frequency) is sampled. Accordingly, the phase of the positive and negative image (730, 740) can be compared to determine the relative phase of the two spectral components (730, 740) of the unknown signal.

Figure 8:
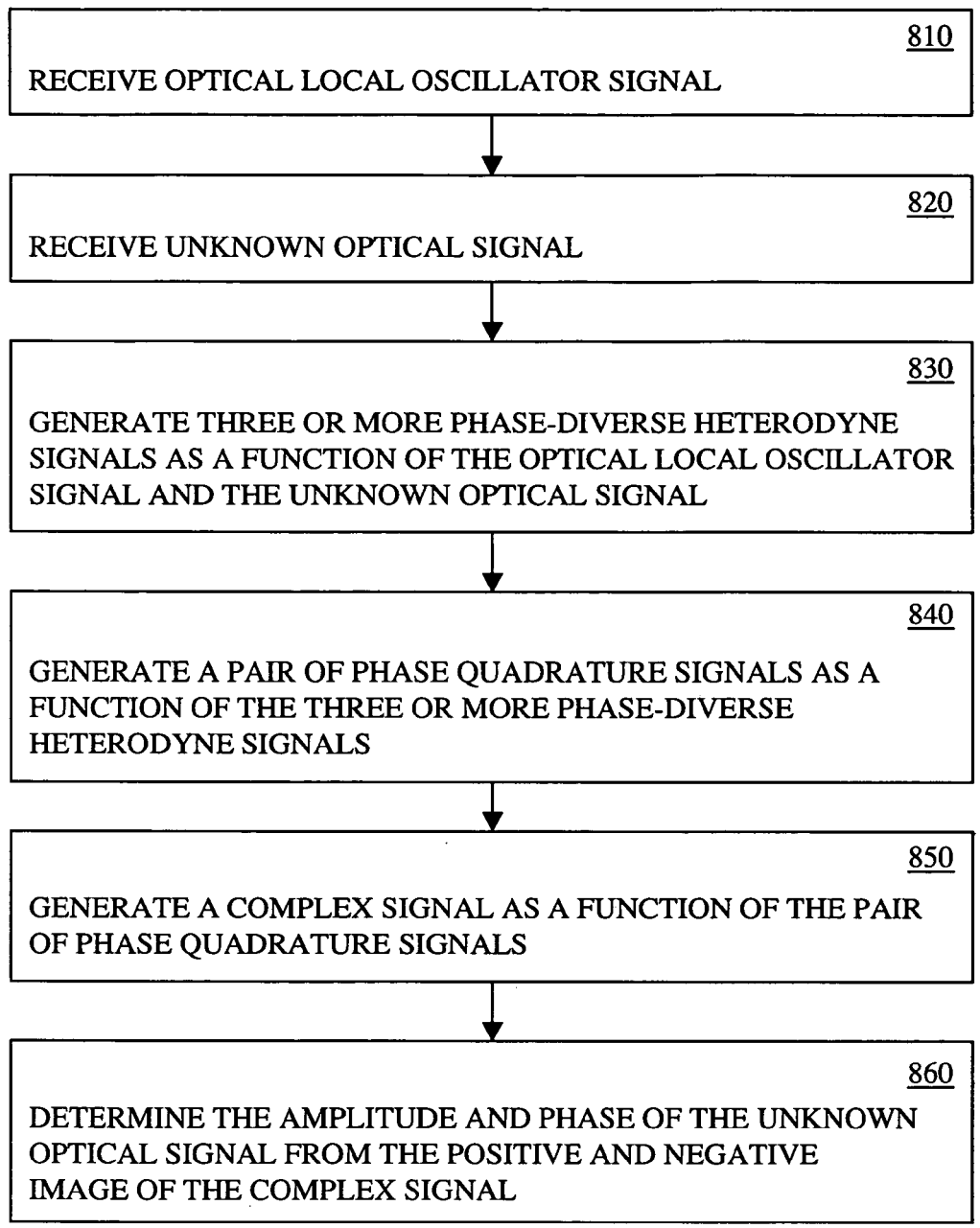
FIG. 8 shows a flow diagram of a method of performing optical spectral analysis, in one embodiment in accordance with the invention.

Referring now to FIG. 8, a flow diagram of a method of performing optical spectral analysis, in one embodiment in accordance with the invention, is shown. As depicted in block 810 of FIG. 8, an optical local oscillator signal is received. In one embodiment in accordance with the invention, the local oscillator signal oscillates at a known frequency. In another embodiment in accordance with the invention, the local oscillator signal sweeps across a range of frequencies.

At block 820, an unknown optical signal is received. In one embodiment in accordance with the invention, the unknown optical signal is from a device under test, an optical network, or the like.

At block 830, three or more phase-diverse heterodyne signals are generated as a function of the received local oscillator signal and the unknown optical signal. In one embodiment in accordance with the invention, generating the three or more phase-diverse heterodyne signals comprises combining and splitting the optical local oscillator signal and the unknown optical signal to form three or more phase-diverse mixed signals. Each phase-diverse mixed signal includes a corresponding phase-diverse heterodyne signal and a noise component. In one embodiment in accordance with the invention, three 120° phase-diverse mixed signals (e.g., M1, M2 and M3) are generated by a receiver comprising a 3×3 optical coupler having a first input coupled to the local oscillator signal and a second input coupled to the unknown optical signal, and having a photo detector and amplifier coupled to each output of the 3×3 optical coupler.

At block 840, a pair of phase quadrature signals (e.g., I and Q) are generated as a function of the three or more phase-diverse heterodyne signals. In one embodiment in accordance with the invention, generating the pair of phase quadrature signals comprises generating a first and second difference signal as a function of the three or more phase-diverse mixed signals. The pair of phase quadrature signals are then generated from the first and second difference signals.

At block 850, a complex signal (e.g., S) is generated as a function of the pair of phase quadrature signals. The complex signal has a positive and negative image component.

At block 860, one or more spectral characteristics (e.g., phase, amplitude) of the unknown optical signal are determined from the complex signal. In one embodiment in accordance with the invention, the phase characteristic of the unknown signal is determined as a function of a phase difference between the positive and negative image components. In another embodiment in accordance with the invention, the amplitude characteristic of the unknown signal is determined as a function of the amplitude of the negative image component, the positive image component, or the average of the positive and negative image components. In addition, by determining the complex spectrum (phase and amplitude), characteristics such as chirp and dispersion, are determined from the complex signal.

Figure 9:
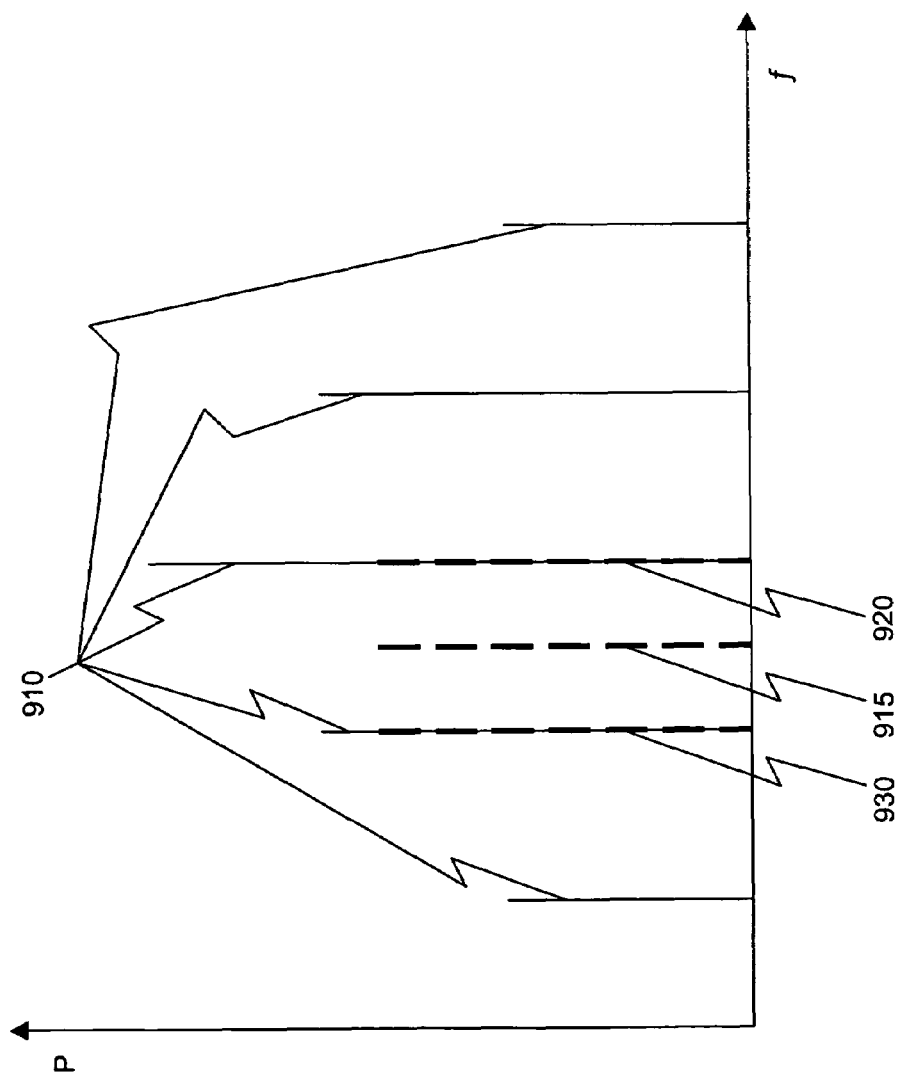
FIG. 9 shows an exemplary graph of frequency-domain representation of an unknown optical signal, in one embodiment in accordance with the invention.

Referring now to FIG. 9, an exemplary graph of a frequency-domain representation of an unknown optical signal 910, in one embodiment in accordance with the invention, is shown. As depicted in FIG. 9, the frequency domain representation of the unknown optical signal 910 comprises a plurality of sidebands. The frequency domain of the local oscillator signal 915, including the positive and negative frequency heterodyne image components 930, 920 thereof, are also shown. The positive and negative image components are located at the optical frequency of the local oscillator signal 915, plus or minus an amount equal to the center frequency of the complex filter. As the local oscillator signal 915 is swept across the unknown optical signal 910 sidebands (e.g., spectrum), a non-zero positive and negative image of the complex signal (corresponding to adjacent sidebands) is measured simultaneously when the local oscillator signal 915 is between two sidebands of unknown optical signal 910 and by a judicious choice of filter. In one embodiment, the complex filter is chosen to correspond to half the frequency spacing of the sidebands in the unknown signal. Accordingly, the complex spectrum (e.g., amplitude and phase) of the unknown optical signal 910 can be determined. Furthermore, a complete frequency-domain description, such as chirp, dispersion and the like, can be determined. The embodiment in accordance with the present invention, provides the ability to measure the complex spectrum of a modulated unknown signal, limited by the bandwidth of the bandpass filter and corresponding electronics.

Figure 10:
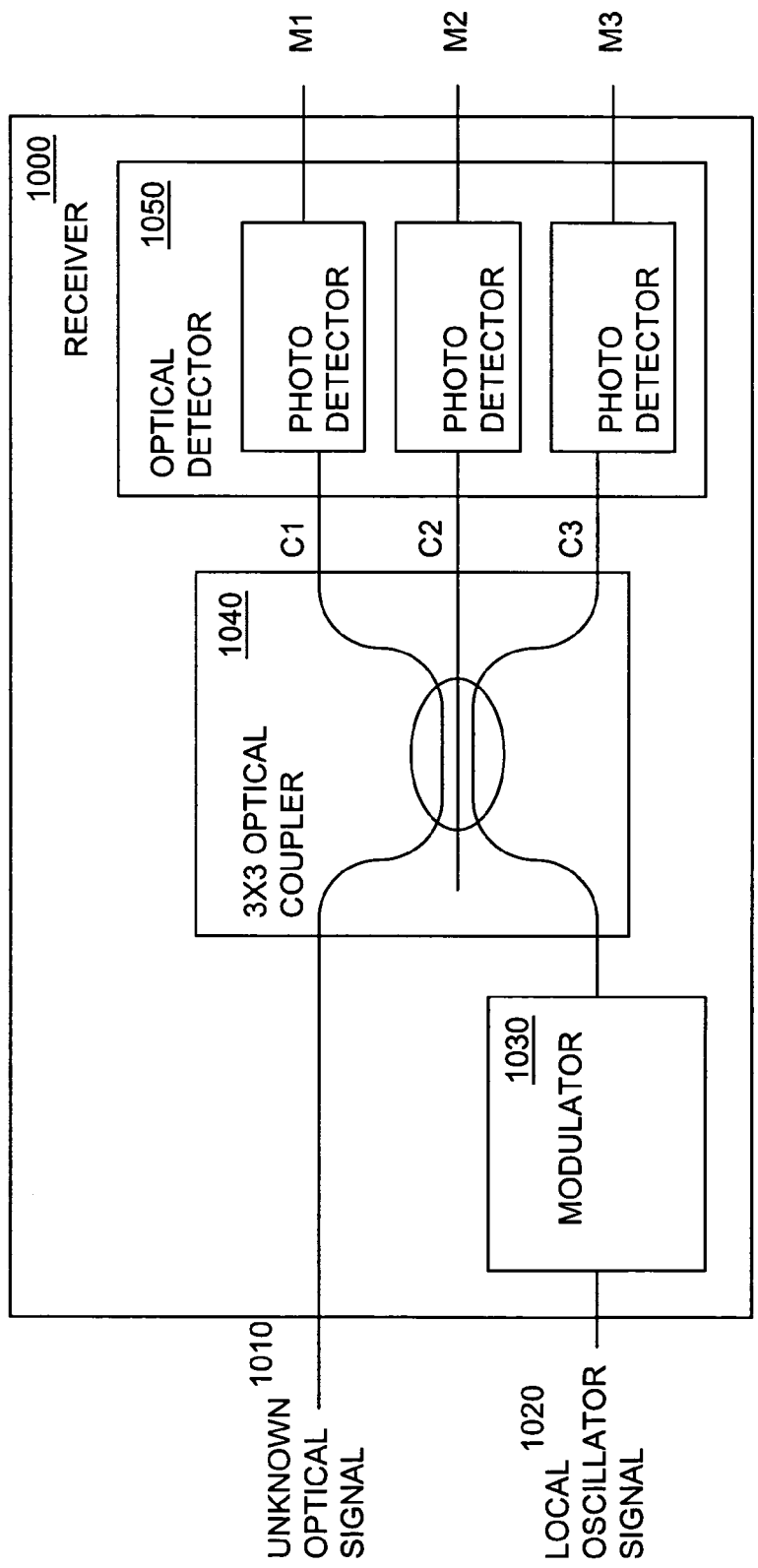
FIG. 10 shows a block diagram of a receiver, in one embodiment in accordance with the invention.

Referring now to FIG. 10, a block diagram of a receiver 1000, in another embodiment in accordance with the invention, is shown. As depicted in FIG. 10, the receiver 1000 comprises a modulator 1030, an optical coupler 1040 and an optical detector 1050.

The modulator 1030 modulates an optical local oscillator signal 1020. In one embodiment, the modulator 1030 modulates the phase of the local oscillator signal 1020. The optical coupler 1040 receives an unknown optical signal 1010 at a first input and the modulated optical local oscillator signal 1020 at a second input. In one embodiment in accordance with the invention, the optical local oscillator signal 1020 is provided by a laser source, such as a tunable external cavity laser diode or the like. In one embodiment in accordance with the invention, the unknown optical signal 1010 is received from a device under test, an optical network, or the like. It is appreciated that the optical signal 1010 has spectral sidebands consistent with data modulation. Measuring the amplitude and phase of these sidebands is desirable.

The optical coupler 1040 combines and splits the modulated optical local oscillator signal 1020 and the unknown optical signal 1010 and generates three or more modulated phase-diverse combined optical signals C1, C2 and C3. The combined optical signals C1, C2 and C3 are received by the optical detector 1050. The optical detector 1050 converts the combined optical signals C1, C2 and C3 into modulated phase-diverse mixed signals M1, M2 and M3.

Figure 11:
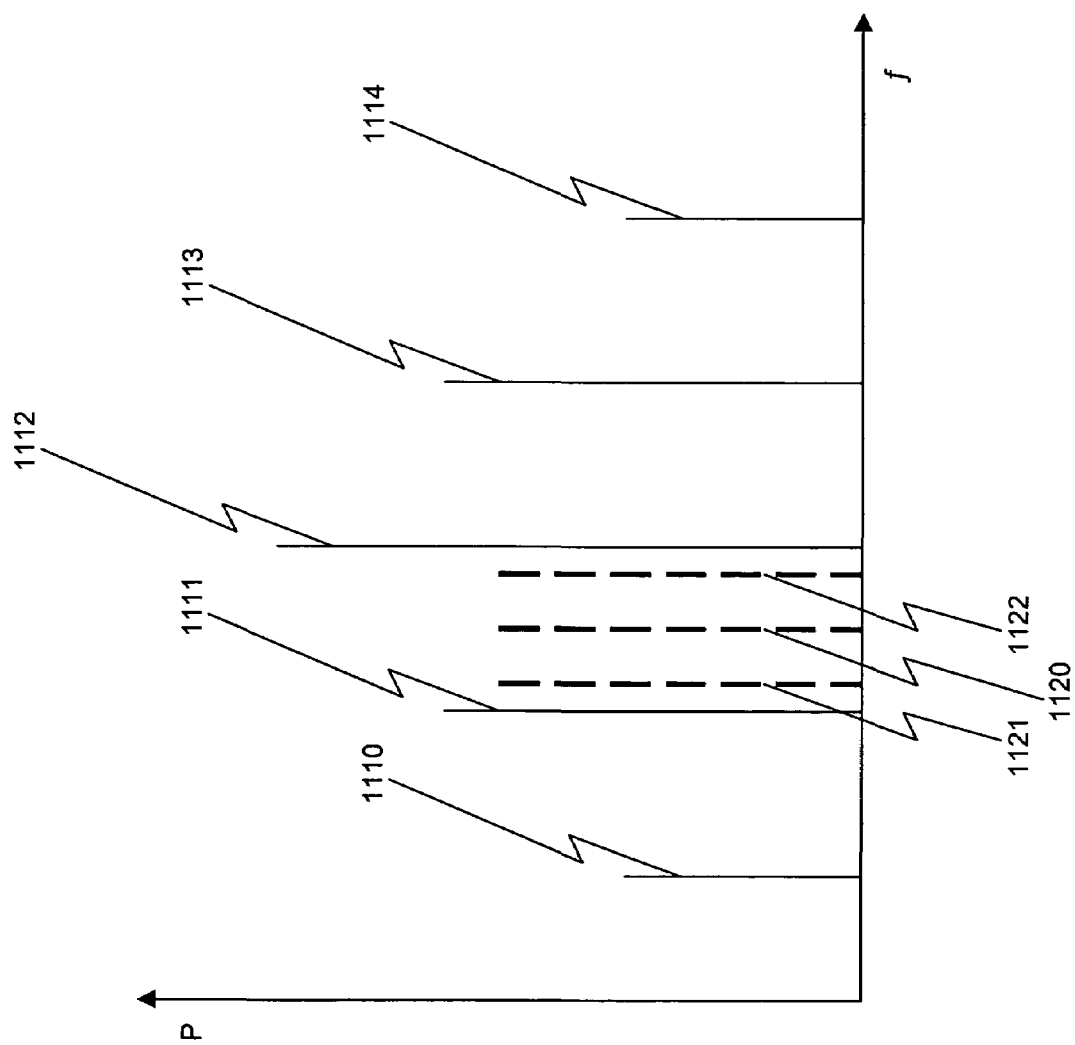
FIG. 11 shows an exemplary graph of frequency-domain representation of a modulated unknown optical signal, in one embodiment in accordance with the invention.

The modulated phase-diverse mixed signals M1, M2 and M3 can be processed according to the above-described embodiments in accordance with the invention. It is appreciated that modulated local oscillator signal is characterized by numerous sidebands as shown in FIG. 11. Accordingly, judicious choice of the isolation frequency of the complex filter and a modulation frequency 1030 of the local oscillator 1020 allows the phase difference between the various sidebands of the unknown signal to be determined for the situation where the sideband spacing of the unknown signal exceeds the bandwidth of the receiver electronics.

Referring now to FIG. 11, an exemplary graph of frequency-domain representation of an unknown optical signal 1110–1114, in one embodiment in accordance with the invention, is shown. As depicted in FIG. 11, the frequency domain representation of the unknown optical signal 1110–1114 comprises a plurality of sidebands including bands 1111 and 1112. The frequency domain of the modulated local oscillator signal 1120, including the dominant positive and negative sideband components 1121, 1122 thereof, are also shown. The positive and negative sideband components 1121, 1122 are located at the optical frequency of the local oscillator signal 1120, plus or minus an amount equal to the frequency of the local oscillator modulator. Signal sideband 1111 and local oscillator sideband 1121 beat to give a negative image while signal sideband 1112 and local oscillator sideband 1122 beat to give a positive image. Hence, by modulating the local oscillator at an appropriate frequency, and by judicious choice of complex filter, we can measure the relative phase of the signal sidebands even though the signal sideband spacing may exceed the bandwidth capabilities of the receiver electronics. As the local oscillator signal 1120 is swept across the unknown optical signal 1110–1114 sidebands (e.g., spectrum), a non-zero positive and negative image of the complex signal (corresponding to adjacent sidebands of the signal) is measured simultaneously when the local oscillator signal 1120 is between two sidebands of unknown optical signal 1110–1114 and by a judicious choice of complex filter and local oscillator modulation frequency. In one embodiment, the complex filter is chosen to correspond to the frequency difference of signal sideband 1111 and local oscillator sideband 1121. The modulation frequency of the local oscillator is accordingly chosen so that this frequency difference is within the bandwidth of the receiver electronics. Accordingly, the complex spectrum (e.g., amplitude and phase) of the unknown optical signal 1110–1114 can be determined. Furthermore, a complete frequency-domain description, such as chirp, dispersion and the like, can be determined. The embodiment in accordance with the present invention, extends the ability to measure the complex spectrum of a modulated unknown signal, and is no longer limited by the bandwidth of the complex filter and corresponding electronics.

Figure 12:
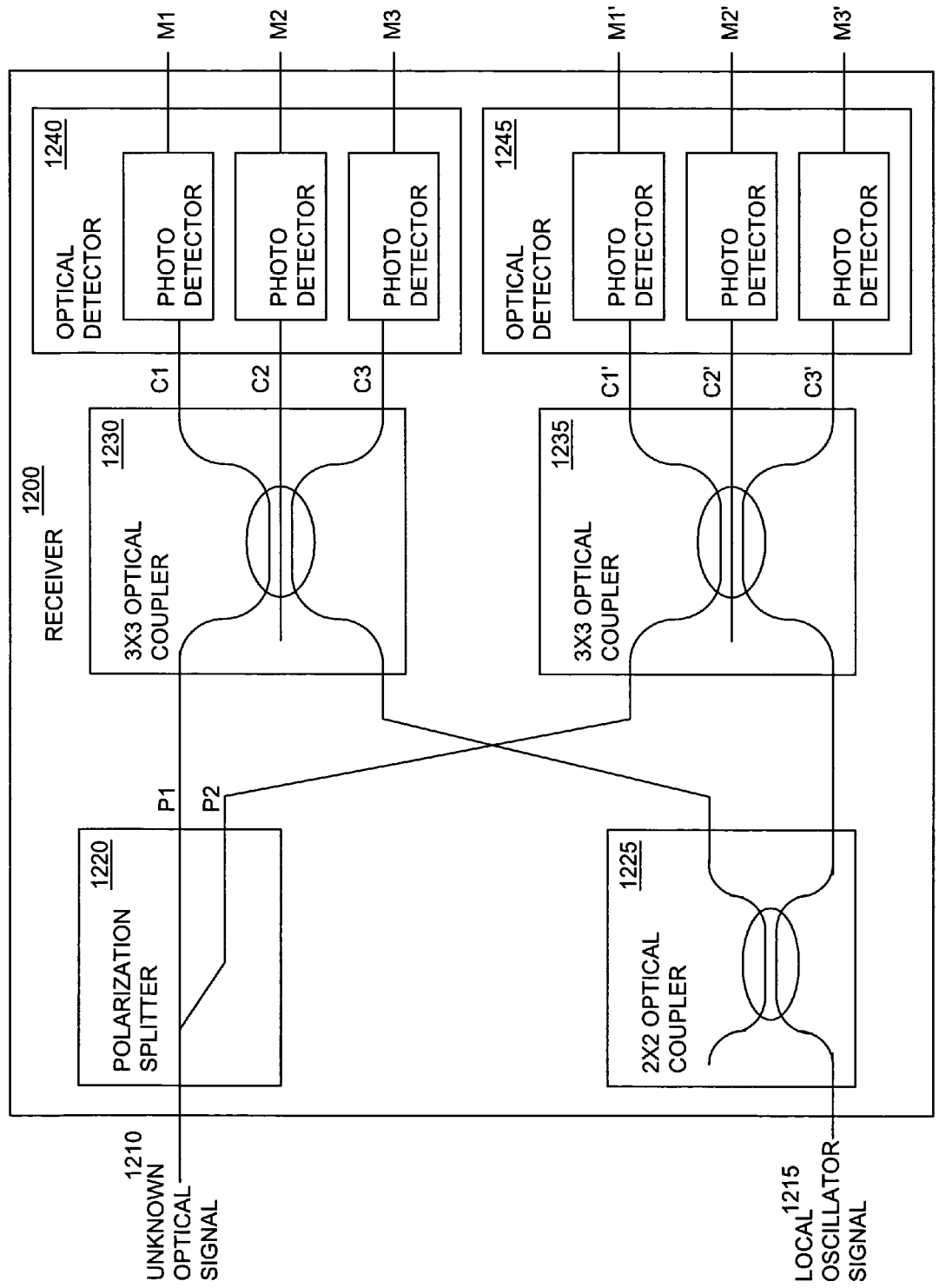
FIG. 12 shows a block diagram of a receiver, in one embodiment in accordance with the invention.

Referring now to FIG. 12, a block diagram of a receiver 1200, in one embodiment in accordance with the invention, is shown. As depicted in FIG. 12, the receiver 1200 comprises a polarization splitter 1220, a plurality of optical couplers 1225, 1230, 1235, and a plurality of optical detectors 1240, 1245.

An unknown optical signal 1210 is received by the polarization splitter 1220. The polarization splitter 1220 generates a first polarized unknown optical signal P1 and a second polarized unknown optical signal P2 as a function of the unknown optical signal. In one embodiment in accordance with the invention, the polarization state of P1 is orthogonal to that of P2. The unknown optical signal 1210 is received from a device under test, an optical network, or the like.

A first optical coupler 1230 receives a local oscillator signal 1215 at a first input. The first optical coupler 1230 also receives the first polarized unknown optical signal P1 at a second input. The first optical coupler 1230 combines and splits the optical local oscillator signal 1215 and the first polarized unknown optical signal P1 thereby generating a first set of phase-diverse combined optical signals C1, C2 and C3. A first optical detector 1240 converts the combined optical signals C1, C2 and C3 into a first set of phase-diverse mixed signals M1, M2 and M3.

A second optical coupler 1235 receives the local oscillator signal 1215 at a first input. The second optical coupler 1235 also receives the second polarized unknown optical signal P2 at a second input. The second optical coupler 1235 combines and splits the optical local oscillator signal 1215 and the second polarization unknown optical signal P2 thereby generating a second set of phase-diverse combined optical signals C1', C2' and C3'. A second optical detector 1245 converts the combined optical signals C1', C2' and C3' into a second set of phase-diverse mixed signals M1', M2' and M3'.

In one embodiment in accordance with the invention, the local oscillator signal 1215 is coupled to the first input of the first optical coupler 1230 and the first input of the second optical coupler 1235 by a third optical coupler 1225. The local oscillator signal 1215 is received at a first input of the third optical coupler 1225 and split for coupling to first and second optical coupler 1230, 1235. In one embodiment in accordance with the invention, the polarizations of P1 and P2 are aligned with the respective local oscillator output from optical coupler 1225. The optical local oscillator signal 1215 is provided by a laser source, such as a tunable external cavity laser diode or the like.

It is appreciated that the first set of phase-diverse mixed signals M1, M2 and M3, and the second set of phase-diverse mixed signals M1', M2' and M3', comprise a polarization-diverse set of measurements. Hence, the first set of phase-diverse mixed signals M1, M2 and M3 and second set of phase-diverse mixed signals M1', M2' and M3' can be processed according to the above-described embodiments in accordance with the invention to determine polarization dependent effects, such as polarization mode dispersion or the like.

The foregoing descriptions of specific embodiments in accordance with the invention have been presented for purposes of illustration and description. They are not intended to be exhaustive or to limit embodiments in accordance with the invention to the precise forms disclosed, and obviously many modifications and variations are possible in light of the above teaching. The embodiments in accordance with the invention were chosen and described in order to best explain the principles of embodiment in accordance with the invention and its practical application, to thereby enable others skilled in the art to best utilize the invention and various embodiments in accordance with the invention with various modifications as are suited to the particular use contemplated. It is intended that the scope of embodiment in accordance with the invention be defined by the Claims appended hereto and their equivalents.

What is claimed is:

1. An optical spectrum analyzer comprising:
   a receiver, for generating three or more phase-diverse mixed signals as a function of an optical local oscillator signal and an unknown optical signal;
   a phase quadrature generator coupled to said receiver, for generating a first and a second phase quadrature signals as a function of said three or more phase-diverse mixed signals; and
   a complex signal generator coupled to said phase quadrature generator, for generating a complex signal as a function of said first and said second phase quadrature signals.

2. The optical spectrum analyzer according to claim 1, further comprising:
   a measurement processing unit coupled to said complex signal generator, for determining a phase of said unknown optical signal as a function of said complex signal; and
   a display unit coupled to said measurement processing unit for presenting said phase.

3. The optical spectrum analyzer according to claim 2, wherein determining said phase of said unknown optical signal comprises determining a phase difference between a negative image component and a positive image component of said complex signal.

4. The optical spectrum analyzer according to claim 2, wherein said measurement processing unit further determines an amplitude of said unknown optical signal as a function of said complex signal.

5. The optical spectrum analyzer according to claim 2, wherein said measurement processing unit further determines a spectral characteristic, selected from the group consisting of chirp, chromatic dispersion and polarization mode dispersion, as a function of said complex signal.

6. The optical spectrum analyzer according to claim 2, further comprising a complex filter coupled between said complex signal generator and said measurement processing unit, wherein a positive and a negative image of said complex signal are isolated from said complex signal.

7. The optical spectrum analyzer according to claim 6, wherein an isolation frequency of said complex filter is chosen to allow for simultaneous measurement of two sidebands within said unknown optical signal.

8. The optical spectrum analyzer according to claim 7, wherein determining said phase of said unknown optical signal comprises determining a phase difference between said negative image component and said positive image component of said complex signal.

9. The optical spectrum analyzer according to claim 1, wherein said receiver comprises:
a coupler for combining and splitting said optical local oscillator signal and said unknown optical signal; and
an optical detector coupled to said coupler, for generating said three or more phase-diverse mixed signals as function of said combined and split said optical local oscillator signal and said unknown optical signal.

10. The optical spectrum analyzer according to claim 1, wherein said receiver comprises:
a modulator, for receiving said optical local oscillator signal and generating a modulated optical local oscillator signal;
a coupler coupled to said modulator, for combining and splitting said modulated optical local oscillator signal and said unknown optical signal; and
an optical detector coupled to said coupler, for generating said three or more phase-diverse mixed signals as a function of said combined and split said modulated optical local oscillator signal and said unknown optical signal.

11. The optical spectrum analyzer according to claim 1, wherein said receiver comprises:
a polarization splitter for receiving said unknown optical signal, wherein a first polarized unknown optical signal and a second polarized unknown optical signal are generated as a function of said unknown optical signal;
a first optical coupler coupled to said polarization splitter, for receiving said first polarized unknown optical signal and said optical local oscillator signal;
a first optical detector coupled to said first optical coupler, for outputting a first set of three or more phase-diverse mixed signals;
a second optical coupler coupled to said polarization splitter, for receiving said second polarized unknown optical signal and said optical local oscillator signal; and
a second optical detector coupled to said second optical coupler, for outputting a second set of three or more phase-diverse mixed signals that are polarization-diverse with respect to said first set of three or more phase-diverse mixed signals.

12. An optical spectrum analyzer comprising:
a first optical coupler comprising;
a first coupler input for receiving an optical local oscillator signal;
a second coupler input for receiving an unknown optical signal; and
a first plurality of coupler outputs;
a first optical detector comprising a first plurality of photo detectors, wherein each photo detector is coupled to a corresponding one of said first plurality of coupler outputs of said first optical coupler;
a first subtraction unit coupled to said first optical detector;
a first transformation unit coupled to said first subtraction unit; and
a first complex signal generation unit coupled to said first transformation unit.

13. The optical spectrum analyzer according to claim 12, further comprising:
a first complex filter coupled to said first complex signal generation unit; and
a measurement processing unit coupled to said first complex filter.

14. The optical spectrum analyzer according to claim 13, further comprising an optical modulator coupled between said local oscillator signal and said first input of said first optical coupler.

15. The optical spectrum analyzer according to claim 14, wherein an isolation frequency of said complex filter corresponds to a function of the frequency spacing of the sidebands of said unknown optical signal.

16. A spectral phase measurement method comprising:
generating three or more phase-diverse mixed signals as a function of an optical local oscillator signal and an unknown optical signal;
generating a first and a second phase quadrature signals as a function of said three or more phase-diverse mixed signals; and
generating a complex signal having a negative image component and a positive image component, as a function of said first and second phase quadrature signals.

17. The method according to claim 16, further comprising determining a relative phase difference between said negative image component and said positive image component.

18. The method according to claim 17, further comprising determining an amplitude of said unknown optical signal from a component of said complex signal consisting of the group comprising an amplitude of said negative image component, an amplitude of said positive image component, and an average amplitude of said negative image component and said positive image component.

19. The method according to claim 18, further comprising sweeping said local oscillator signal across a frequency spectrum of said unknown optical signal.

20. The method according to claim 19, further comprising determining a spectral characteristic of said unknown optical signal as a function of said determined relative phase difference and said determined amplitude for each of said frequency of said optical local oscillator signal.

21. The method according to claim 20, wherein said spectral characteristic is selected from a group consisting of phase, amplitude, frequency, polarization, chirp and dispersion.

22. The method according to claim 16, wherein said generating said three or more phase-diverse mixed signals comprises:
combining said optical local oscillator signal and said unknown optical signal;
splitting said combined said optical local oscillator signal and said unknown optical signal into three or more phase-diverse combined signals; and
converting each of said three or more phase-diverse combined signals into a corresponding one of said three or more phase-diverse mixed signals.

23. The method according to claim 16, wherein said generating said first and said second phase quadrature signals comprises:
generating a first and a second difference signals as a function of said three or more phase-diverse mixed signals; and generating said first and said second phase quadrature signals as a function of said first and said second difference signals.

24. The spectral phase measurement method according to claim 23, further comprising:
sweeping a frequency of said optical local oscillator signal through a frequency spectrum of said unknown optical signal; and
determining a spectral phase characteristic of said unknown optical signal as a function of a relative phase difference between said negative image component and said positive image component, for each of said frequency of said optical local oscillator signal.

25. The spectral phase measurement method according to claim 24, further comprising determining a spectral amplitude characteristic of said unknown optical signal as a function of a component of said complex signal for each of said frequency of said optical local oscillator signal, wherein said component of said complex signal is selected from the group consisting of an amplitude of said negative image component, an amplitude of said positive image component, and an average amplitude of said negative image component and said positive image component.

26. The spectral phase measurement method according to claim 25, further comprising determining a complex domain representation of said unknown optical signal as a function of said spectral phase characteristic and said spectral amplitude characteristic.

27. The spectral phase measurement method according to claim 26, further comprising determining a time domain representation of said unknown optical signal as a function of said complex domain representation.

* * * * *